(12) United States Patent
Wu et al.

(10) Patent No.: US 12,305,433 B2
(45) Date of Patent: May 20, 2025

(54) HUMAN MACHINE INTERFACE PANEL AND FIXING DEVICE THEREOF

(71) Applicant: Delta Electronics, Inc., Taoyuan (TW)

(72) Inventors: Yu-Lun Wu, Taoyuan (TW); Wen-Yi Tang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 217 days.

(21) Appl. No.: 18/202,242

(22) Filed: May 25, 2023

(65) Prior Publication Data

US 2024/0068284 A1 Feb. 29, 2024

Related U.S. Application Data

(60) Provisional application No. 63/400,930, filed on Aug. 25, 2022.

(30) Foreign Application Priority Data

Jan. 16, 2023 (CN) .......................... 202310060917.X

(51) Int. Cl.
*E05C 19/18* (2006.01)
*F16B 25/10* (2006.01)

(52) U.S. Cl.
CPC .......... *E05C 19/188* (2013.01); *F16B 25/103* (2013.01)

(58) Field of Classification Search
CPC .............................. E05C 19/188; F16B 25/103
See application file for complete search history.

(56) References Cited

U.S. PATENT DOCUMENTS

| 3,171,623 | A | 3/1965 | Lawson et al. | |
| 6,604,764 | B2* | 8/2003 | Zemzik | E05C 19/188 292/288 |
| 8,544,899 | B2* | 10/2013 | Hertrich | E05C 19/188 292/DIG. 60 |
| 9,856,682 | B1* | 1/2018 | Cook | E05C 19/18 |
| 2020/0383218 | A1 | 12/2020 | Lai | |

FOREIGN PATENT DOCUMENTS

| CN | 106643509 A | 5/2017 |
| CN | 111220071 A | 6/2020 |
| CN | 215030623 U | 12/2021 |
| TW | M512678 U | 11/2015 |
| TW | M568392 U | 10/2018 |

* cited by examiner

*Primary Examiner* — Amy J. Sterling
(74) *Attorney, Agent, or Firm* — KIRTON McCONKIE; Evan R. Witt

(57) ABSTRACT

The present disclosure provides a human machine interface panel including a main body and a fixing device. The main body includes a housing and a first contact surface. The fixing device includes a base, a self-tapping screw and a bottom base. The base is detachably connected to the housing and has a mounting hole. The self-tapping screw penetrates through the mounting hole and has an interference fit to the mounting hole. The bottom base is disposed at an end of the self-tapping screw. By disposing a plate between the bottom base and the first contact surface, and tightening the self-tapping screw, the plate is clamped by the bottom base and the first contact surface. Consequently, the human machine interface panel is fixed to the plate.

12 Claims, 16 Drawing Sheets

HUMAN MACHINE INTERFACE PANEL AND FIXING DEVICE THEREOF

CROSS-REFERENCE TO RELATED APPLICATION

This application claims the benefit of U.S. Provisional Application No. 63/400,930, filed on Aug. 25, 2022 and entitled "HUMAN MACHINE INTERFACE PANEL AND FIXING DEVICE THEREOF". This application claims priority to China Patent Application No. 202310060917.X, filed on Jan. 16, 2023. The entireties of the above-mentioned patent applications are incorporated herein by reference for all purposes.

FIELD OF THE INVENTION

The present disclosure relates to a human machine interface panel, and more particularly to a human machine interface panel having fixing devices, which achieves the advantages of easily assembling, preventing the panel from damages and reducing costs.

BACKGROUND OF THE INVENTION

Generally, conventional human machine interface (HMI) panel includes a main body and a mounting plate. The mounting plate has a first part and a second part which are connected and adjacent to each other. The first part is formed by bending the second part at a specific angle. The first part of the mounting plate is fixed to the main body by screws, and the second part of the mounting plate is fixed to a device by screws, so that the HMI panel is fixed to the device through the auxiliary of the mounting plate. However, the production cost of the mounting plate is high, and the assembly process is difficult and complicated. In addition, if the screws are overtightened during the assembly process, the mounting plate or the main body may be sunken and deformed, which results in damage to the main body, abnormal waterproof function of the main body, or failure of the fixing device to clamp the mounting plate, etc.

In some conventional HMI panels, the fixing device is integrally disposed on the main body, so that the HMI panel is fixed to the device through the fixing device. However, the above-mentioned fixing device has disadvantages of high production cost and large size. Moreover, when the above-mentioned fixing device is damaged, the main body and the fixing device need to be replaced at the same time. Consequently, the maintenance cost is high. Furthermore, the conventional fixing device is made of metal materials, the production cost is high, and the structural strength is high, so that it cannot prevent operators from overtightening screws.

Therefore, there is a need of providing a human machine interface panel and a fixing device thereof to obviate the drawbacks encountered from the prior arts.

SUMMARY OF THE INVENTION

It is an objective of the present disclosure to provide a human machine interface panel and fixing device thereof, which achieves the advantages of easily assembling, preventing the panel from damage and reducing cost.

In accordance with an aspect of the present disclosure, a human machine interface panel is provided. The human machine interface panel is configured to combine with a plate. The human machine interface panel includes a main body and at least one fixing device. The main body includes a housing and a first contact surface. The housing is disposed on at least a part of the first contact surface. The at least one fixing device includes a base, a self-tapping screw and a bottom base. The base is detachably connected to the housing of the main body, and has a mounting hole. The self-tapping screw penetrates through the mounting hole, and has an interference fit to the mounting hole. The bottom base is disposed at an end of the self-tapping screw. By disposing the plate between the bottom base and the first contact surface and tightening the self-tapping screw, the plate is clamped by the bottom base and the first contact surface, so that the human machine interface panel is fixed to the plate.

In accordance with another aspect of the present disclosure, a fixing device for a human machine interface panel is disclosed. The human machine interface panel is configured to combine with a plate and includes a main body. The main body includes a housing and a first contact surface. The housing is disposed on at least a part of the first contact surface. The fixing device includes a base, a self-tapping screw and a bottom base. The base is detachably connected to the housing of the main body, and has a mounting hole. The mounting hole penetrates through the base. The self-tapping screw penetrates through the mounting hole and has an interference fit to the mounting hole. The bottom base is disposed at an end of the self-tapping screw. By disposing the plate between the bottom base and the first contact surface, and tightening the self-tapping screw, the plate is clamped by the bottom base and the first contact surface, so that the human machine interface panel is fixed to the plate.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
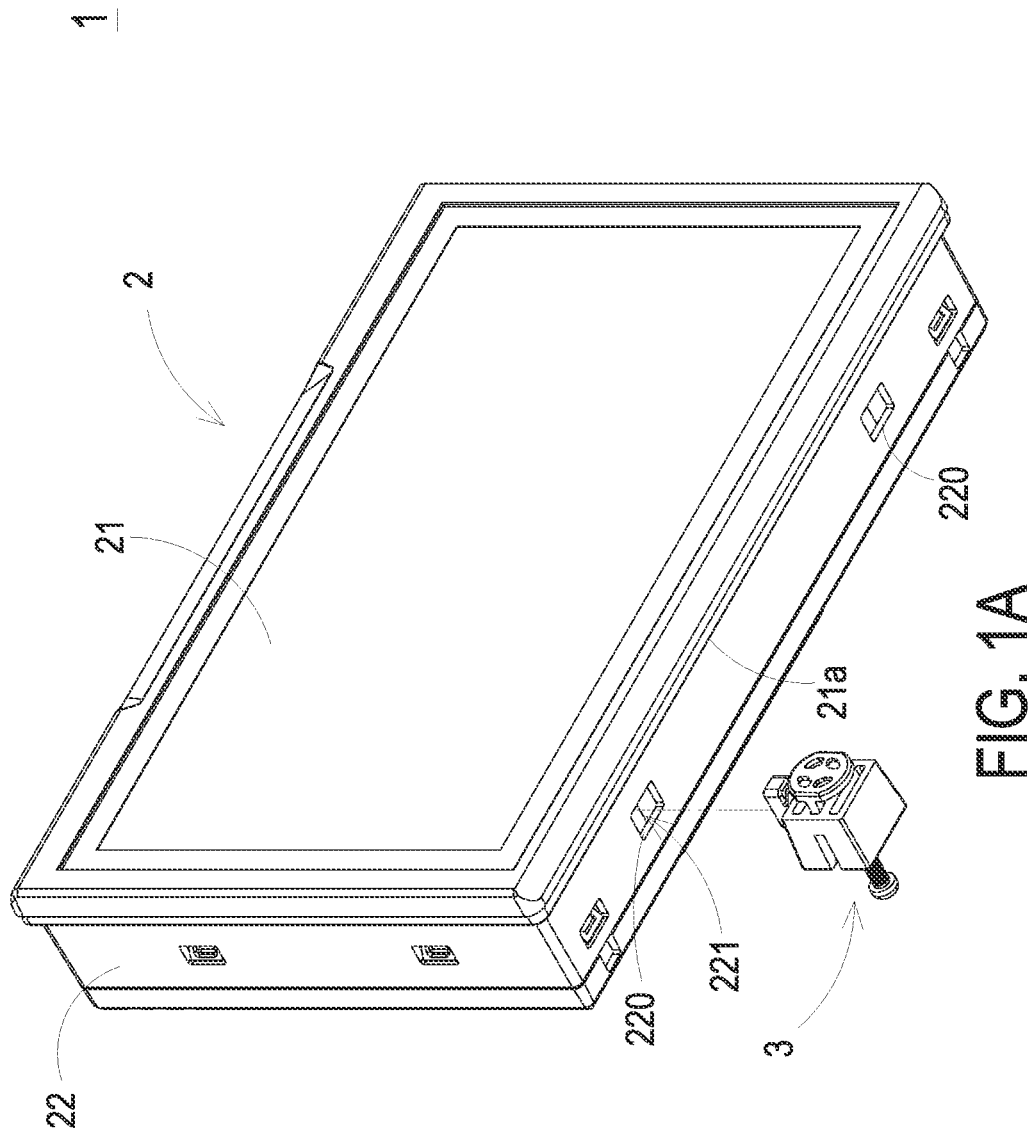
FIG. 1A is a schematic perspective view illustrating a main body and a fixing device of a human machine interface panel according to an embodiment of the present disclosure.
Figure 1B:
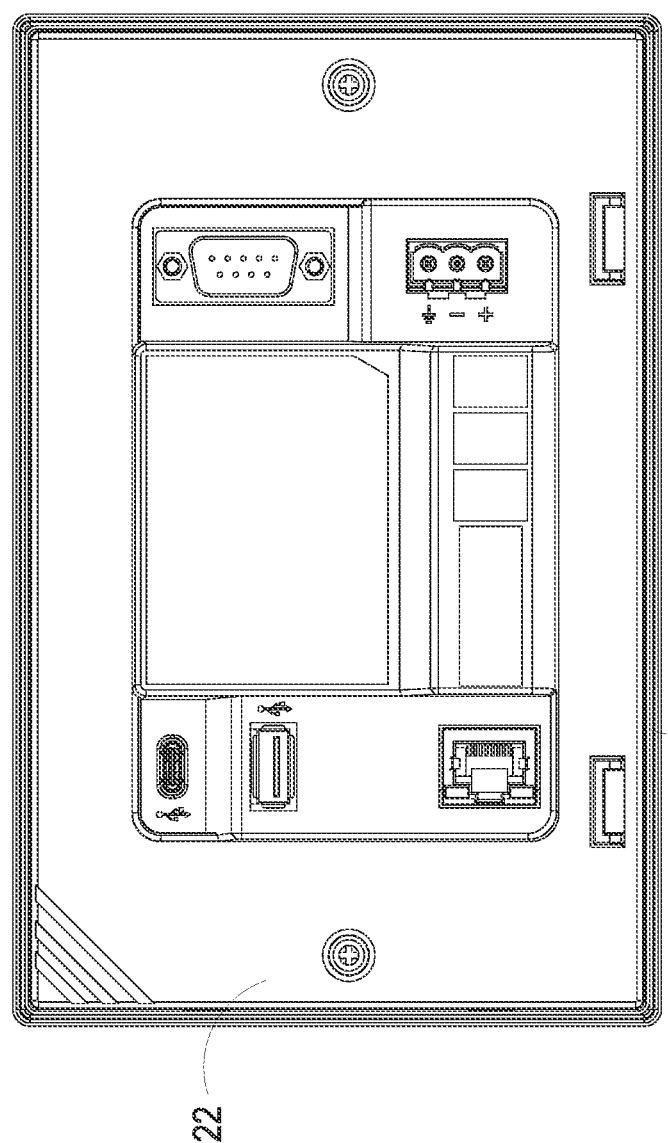
FIG. 1B is a rear view illustrating the main body of the human machine interface panel of FIG. 1A.
Figure 2A:
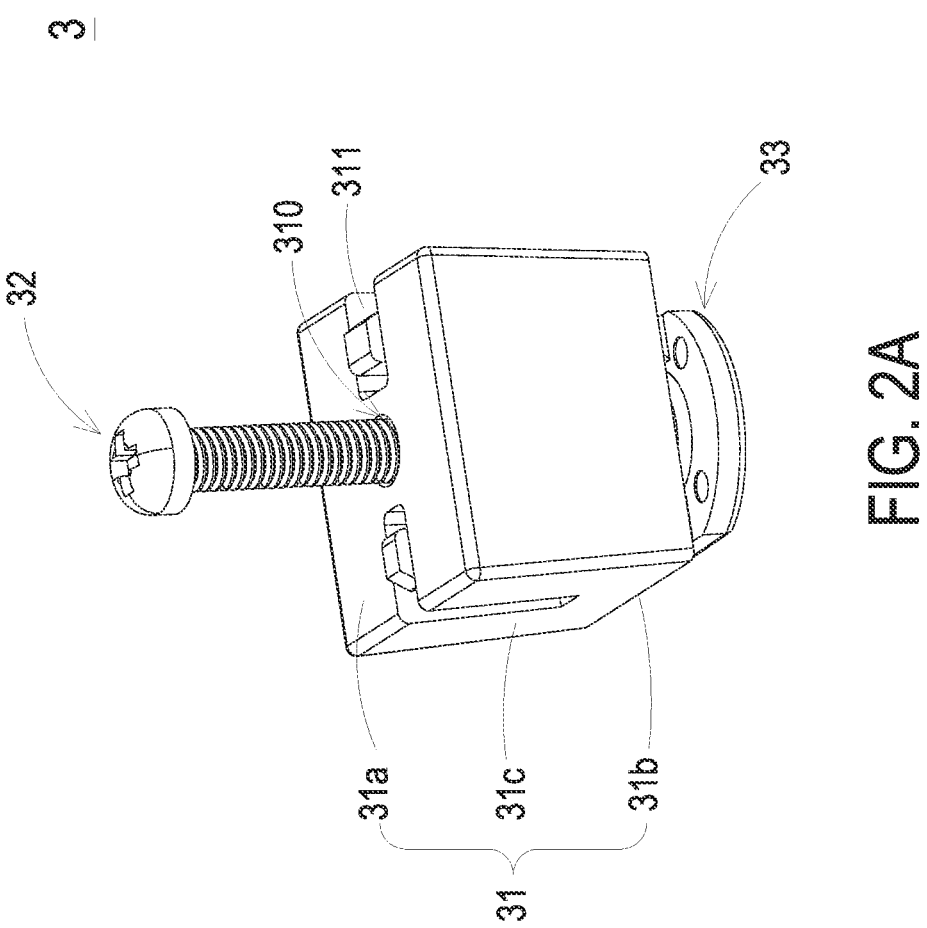
FIG. 2A is a schematic perspective view illustrating the fixing device of FIG. 1A.
Figure 2B:
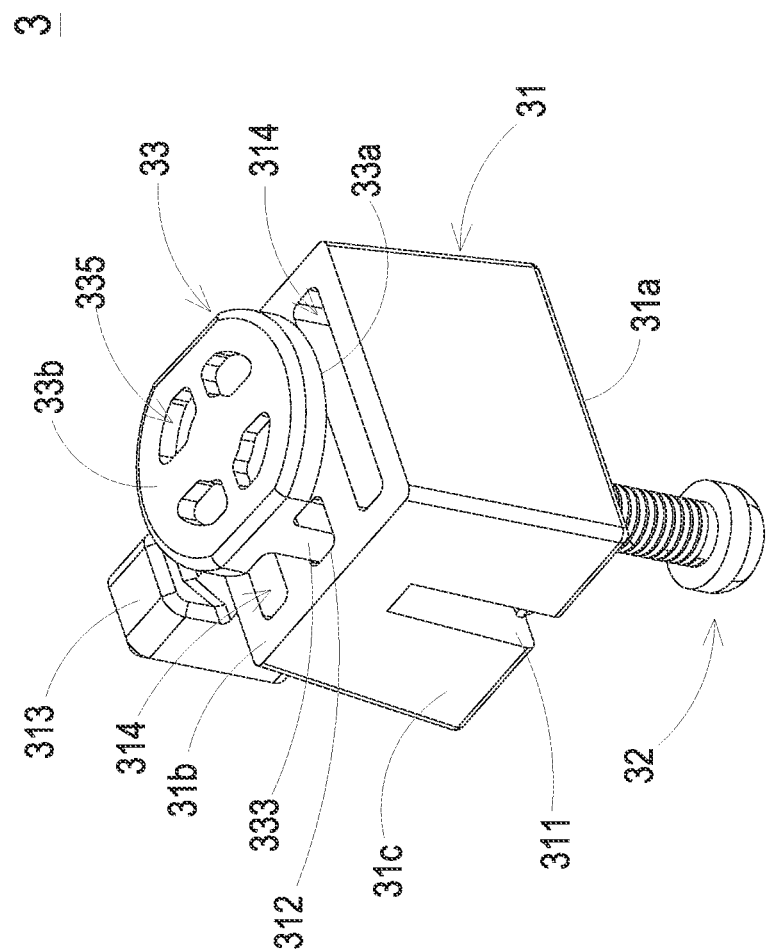
FIG. 2B is a schematic perspective view illustrating the fixing device of FIG. 1A from another perspective.
Figure 2C:
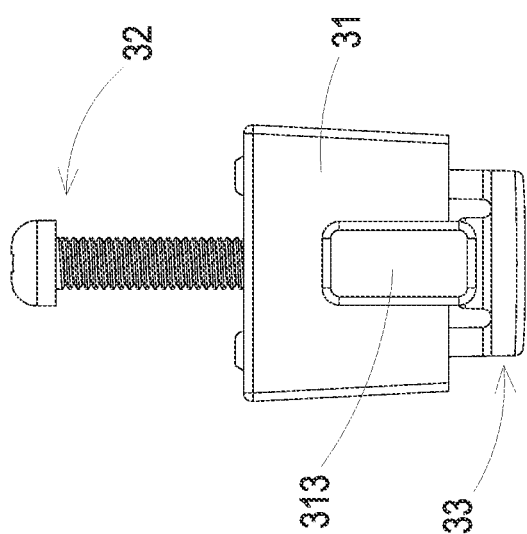
FIG. 2C is a front view illustrating the fixing device of FIG. 2A.
Figure 2D:
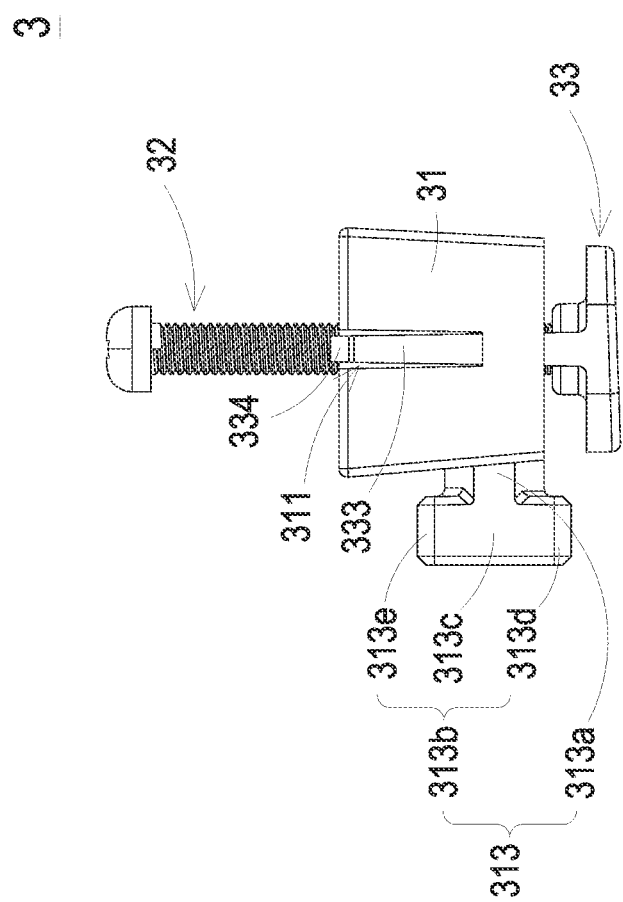
FIG. 2D is a right side view illustrating the fixing device of FIG. 2A.
Figure 2E:
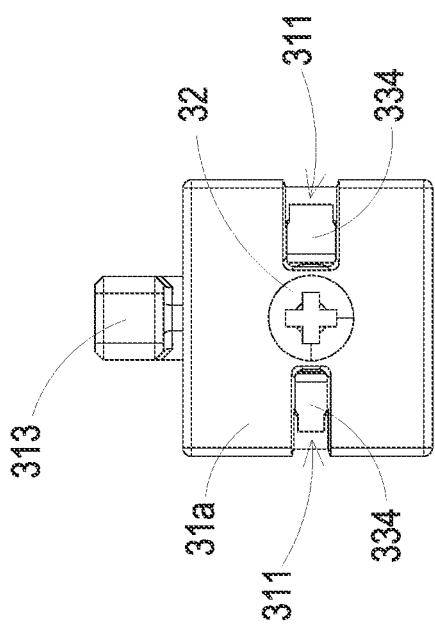
FIG. 2E is a top view illustrating the fixing device of FIG. 2A.
Figure 3:
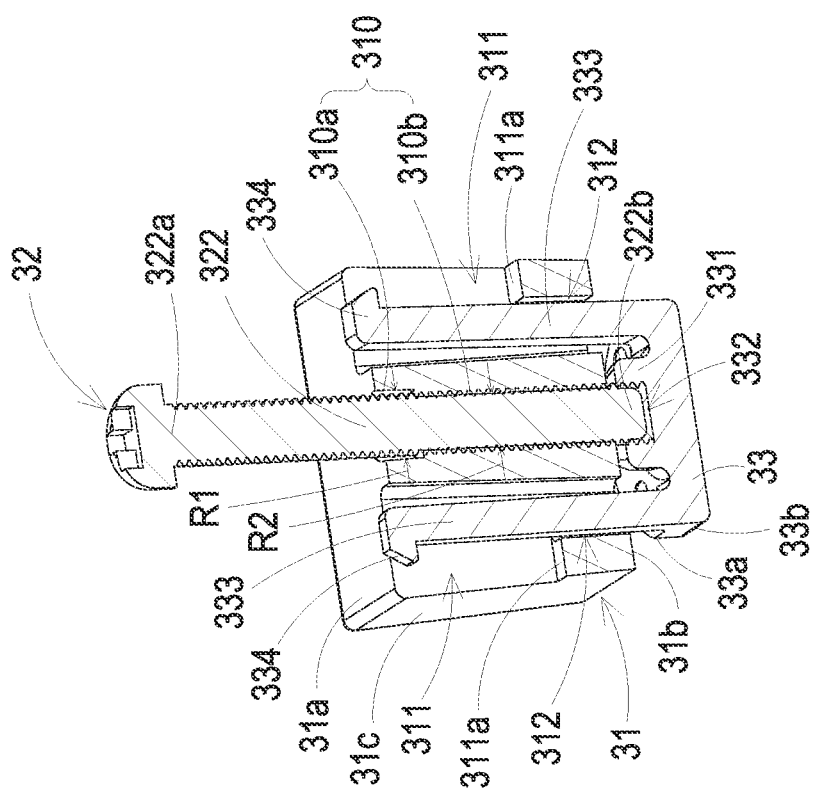
FIG. 3 is a cross-sectional view illustrating the fixing device of FIG. 2A.
Figure 4:
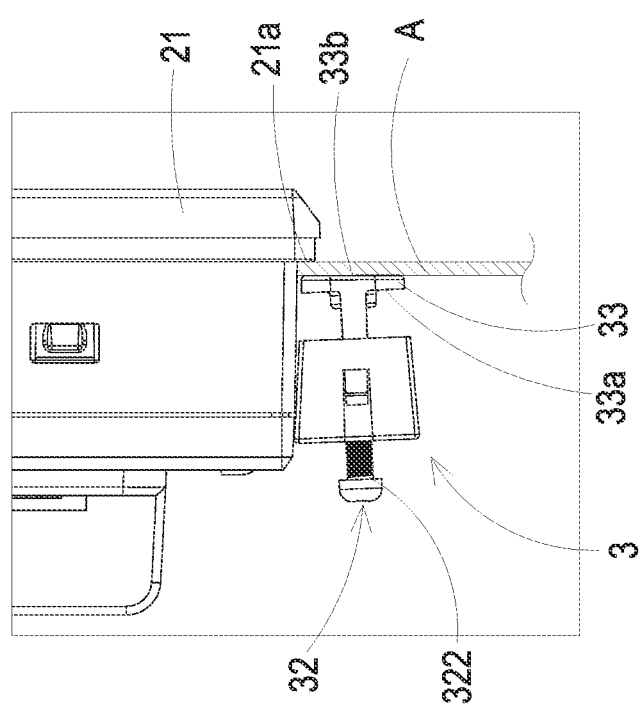
FIG. 4 is a schematic perspective view illustrating the human machine interface panel of FIG. 1A fixed to a plate.

FIG. 1A is a schematic perspective view illustrating a main body and a fixing device of a human machine interface panel according to an embodiment of the present disclosure, FIG. 1B is a rear view illustrating the main body of the human machine interface panel of FIG. 1A, FIG. 2A is a schematic perspective view illustrating the fixing device of FIG. 1A, FIG. 2B is a schematic perspective view illustrating the fixing device of FIG. 1A from another perspective, FIG. 2C is a front view illustrating the fixing device of FIG. 2A, FIG. 2D is a right side view illustrating the fixing device of FIG. 2A, FIG. 2E is a top view illustrating the fixing device of FIG. 2A, FIG. 3 is a cross-sectional view illustrating the fixing device of FIG. 2A, and FIG. 4 is a schematic perspective view illustrating the human machine interface panel of FIG. 1A fixed to a plate. Please refer to FIG. 1A. In the embodiment, the human machine interface panel 1 includes a main body 2 and a fixing device 3. The main body 2 includes a display screen 21 and a housing 22. A rear side of the display screen 21 has a first contact surface 21a. Please refer to FIGS. 1A and 1B. The housing 22 is disposed on at least a part of the first contact surface 21a. Please refer to FIGS. 1A, 2A and 3. The fixing device 3 includes a base 31, a self-tapping screw 32 and a bottom base 33. The base 31 is made of plastic material, and is detachably connected to the housing 22 of the main body 2. The base 31 has a mounting hole 310, and the mounting hole 310 penetrates through the base 31. The mounting hole 310 has a first segment 310a and a second segment 310b which are in communication with each other. A first aperture R1 of the first segment 310a is greater than a second aperture R2 of the second segment 310b. The self-tapping screw 32 penetrates through the mounting hole 310, and has an interference fit to the second segment 310b of the mounting hole 310. The bottom base 33 is disposed at an end of the self-tapping screw 32 and is adjacent to the second segment 310b of the mounting hole 310. As shown in FIGS. 1A, 3 and 4, by disposing a plate A between the bottom base 33 of the fixing device 3 and the first contact surface 21a of the display screen 21, and tightening the self-tapping screw 32 by a fixing tool, the plate A is clamped by the bottom base 33 of the fixing device 3 and the first contact surface 21a of the display screen 21. Consequently, the human machine interface panel 1 is fixed to the plate A. The fixing tool is for example but not limited to a screwdriver. In the present embodiment, a maximum torque of the interference fit between the self-tapping screw 32 and the second segment 310b of the mounting hole 310 is related to a ratio of the first segment 310a and the second segment 310b. By adjusting the ratio of the first segment 310a and the second segment 310b, the maximum torque of the interference fit between the self-tapping screw 32 and the second segment 310b of the mounting hole 310 is adjusted to a specific value. In other words, when the ratio is adjusted to be smaller, the first segment 310a has a smaller proportion and the second segment 310b has a greater proportion, which has an increased interference fit to the self-tapping screw 32, so that the maximum torque is increased. If a user overtightens the self-tapping screw 32 and the torque generated by the interference fit between the self-tapping screw 32 and second segment 310b exceeds the maximum torque, the second segment 310b of the mounting hole 310 of the base 31 made of plastic material may be damaged, for example but not limited to chipped teeth, so that the self-tapping screw 32 cannot generate thrust. Consequently, the plate A and the display screen 21 are prevented from being damaged due to excessive thrust. In addition, the base 31 and the bottom base 33 of the fixing device 3 are made of plastic material, for example but not limited to be manufactured by the injection molding process. Consequently, the advantages of low cost and easily replacing are achieved. In the present embodiment, the size of the display screen 21 of the main body 2 of the human machine interface panel 1 is 7 inches, but not limited thereto.

Figure 5:
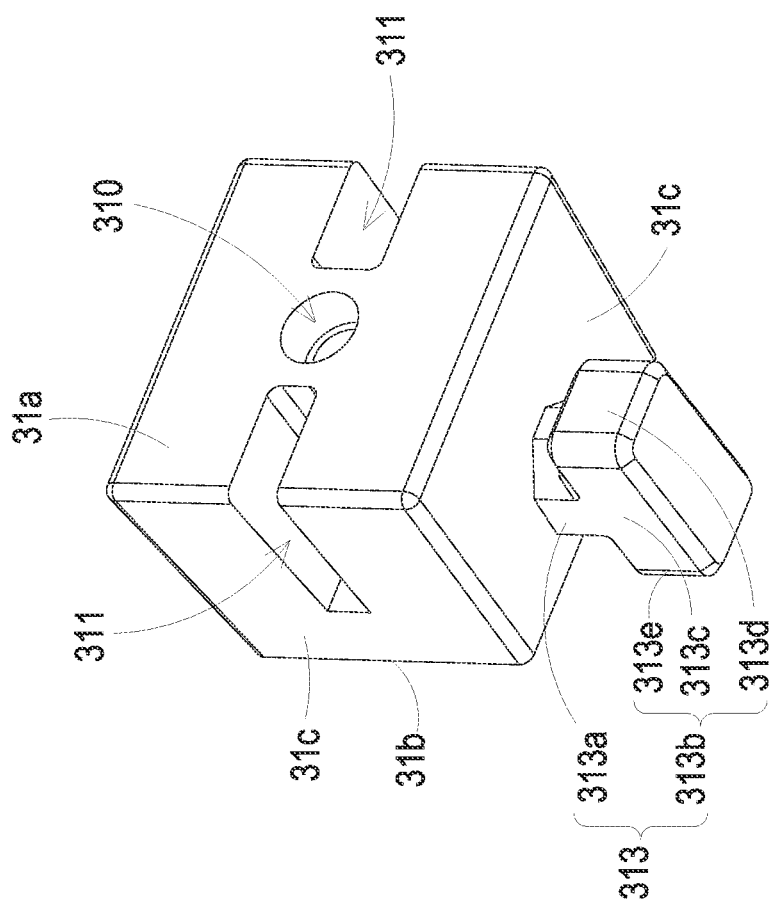
FIG. 5 is a schematic perspective view illustrating a base of the fixing device of FIG. 2A.

FIG. 5 is a schematic perspective view illustrating a base of the fixing device of FIG. 2A. Please refer to FIGS. 2A, 2B, 3 and 5. In the embodiment, the base 31 of the fixing device 3 has a top surface 31a, a bottom surface 31b and a plurality of lateral surfaces 31c. The plurality of lateral surfaces 31c are in connection between the top surface 31a and the bottom surface 31b, and are connected adjacent to each other. The mounting hole 310 penetrates through the top surface 31a and the bottom surface 31b of the base 31. The first segment 310a of the mounting hole 310 penetrates through the top surface 31a. The second segment 310b of the mounting hole 310 penetrates through the bottom surface 31b. In the present embodiment, an area of the top surface 31a is greater than an area of the bottom surface 31b, and the base 31 is tapered from the top surface 31a to the bottom surface 31b, but not limited thereto.

Please refer to FIG. 2B. In the embodiment, the base 31 of the fixing device 3 includes two hollow portions 314. The two hollow portions 314 are recessed from the bottom surface 31b toward the top surface 31a, respectively. Due to the hollow portions 314, there are less plastic material used in the base 31, and the advantages of low cost and reducing weight of the fixing device 3 are achieved.

Figure 6:
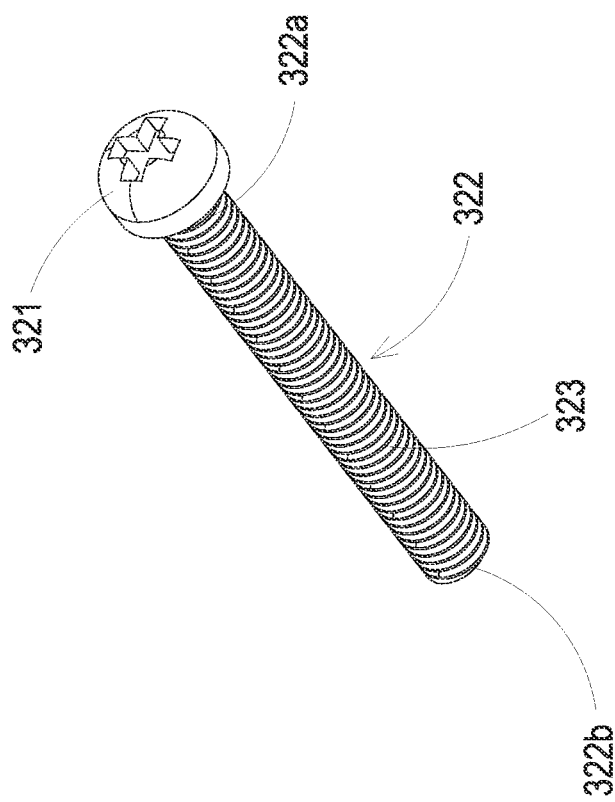
FIG. 6 is a schematic perspective view illustrating a self-tapping screw of the fixing device of FIG. 2A.

FIG. 6 is a schematic perspective view illustrating a self-tapping screw of the fixing device of FIG. 2A. Please refer to FIGS. 2A, 3 and 6. In the embodiment, the self-tapping screw 32 of the fixing device 3 is configured to tap the second segment 310b of the mounting hole 310, so that an interference fit between the self-tapping screw 32 and the second segment 310b of the mounting hole 310 is formed. The self-tapping screw 32 includes a nut 321, a rod 322 and a thread 323. The rod 322 has a first end 322a and a second end 322b disposed opposite to each other. The nut 321 is disposed on the first end 322a of the rod 322. The thread 323 is surrounded on the rod 322. The second end 322b of the self-tapping screw 32 is rotatably connected to the bottom base 33. In the present embodiment, the self-tapping screw 32 is manually fixed to the bottom base 33. In some embodiments, the second end 322b of the self-tapping screw 32 and the bottom base 33 are integrally formed into one piece structure by an insert molding process, but not limited thereto.

Figure 7:
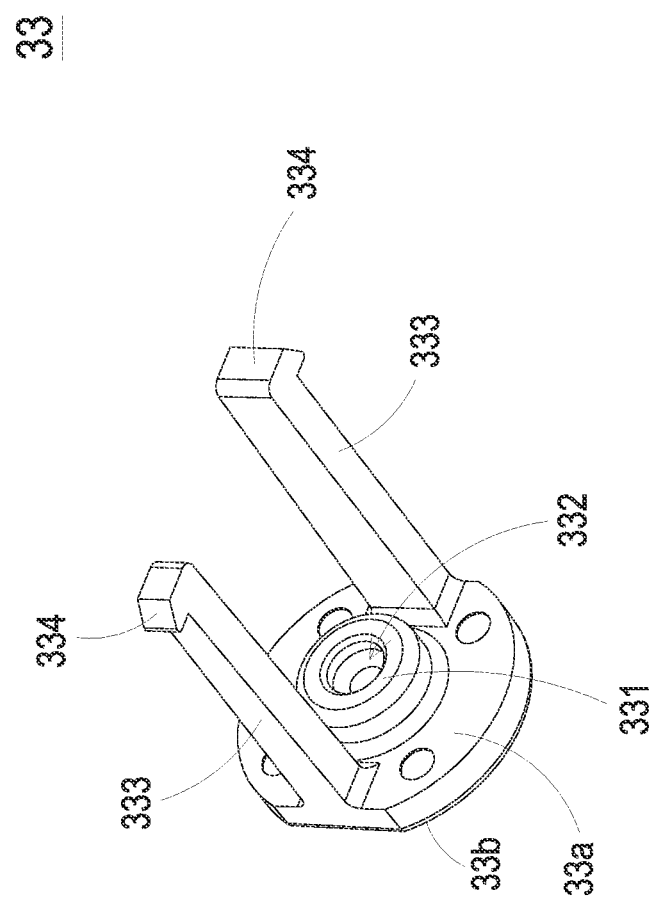
FIG. 7 is a schematic perspective view illustrating a bottom base of the fixing device of FIG. 2A.

FIG. 7 is a schematic perspective view illustrating a bottom base of the fixing device of FIG. 2A. Please refer to FIGS. 2A, 2B, 3 and 7. In the embodiment, the bottom base 33 of the fixing device 3 includes a first surface 33a and a second surface 33b disposed opposite to each other. The first surface 33a is disposed toward the self-tapping screw 32. The second end 322b of the self-tapping screw 32 is connected to the first surface 33a of the bottom base 33. The second surface 33b is disposed toward a direction away from the self-tapping screw 32. An area of the second surface 33b is greater than a cross-sectional area of the rod 322 of the self-tapping screw 32. As shown in FIG. 4, the second surface 33b of the bottom base 33 with a larger area is contacted against the plate A, so that the pressure applied to the plate A is small, and the damage caused by the rod 322 of the self-tapping screw 32 with smaller area directly contacting against the plate A is prevented. In the present embodiment, an angle (not shown) is formed between the second surface 33b of the bottom base 33 and a horizontal plane, but not limited thereto.

As shown in FIG. 2B, in the embodiment, the bottom base 33 of the fixing device 3 is for example but not limited to a plastic component produced by an injection molding process, and includes a plurality of concaves 335. The plurality of concaves 335 are recessed from the second surface 33b of the bottom base 33 toward the first surface 33a. The thickness of the bottom base 33 is thinner due to the plurality of concaves 335, so that the risk of deforming during the cooling process of the injection molding process is prevented.

As shown in FIGS. 3 and 7, in the present embodiment, the bottom base 33 includes a protrusion 331 and a positioning recess 332. The protrusion 331 is extended from the first surface 33a of the bottom base 33 along a direction perpendicular to the first surface 33a. The positioning recess 332 is recessed from a surface of the protrusion 331. In an embodiment, the protrusion 331 surrounds the positioning recess 332. The second end 322b of the self-tapping screw 32 is rotatably connected to the positioning recess 332, so that the self-tapping screw 32 is positioned.

As shown in FIGS. 2A, 2B, 2D, 2E, 3 and 5, in the embodiment, the base 31 of the fixing device 3 includes two grooves 311 and two perforations 312. The two grooves 311 are in communication with the corresponding one of the perforations 312, respectively. The two grooves 311 are inwardly recessed from the top surface 31a and the two opposite lateral surfaces 31c of the base 31, respectively. Two second contact surfaces 311a are formed in the two grooves 311, respectively. The two second contact surfaces 311a are parallel to the top surface 31a, but not limited thereto. The two perforations 312 penetrate through the second contact surfaces 311a and the bottom surface 31b of the base 31, respectively. As shown in FIGS. 3 and 7, in the embodiment, the bottom base 33 of the fixing device 3 includes two arms 333 and two hooks 334. The two arms 333 are disposed on two opposite sides of the bottom base 33, respectively, and are extended from the first surface 33a of the bottom base 33 along a direction away from the first surface 33a, respectively. The two hooks 334 are disposed on corresponding one of ends of two arms 333. The two arms 333 are partially disposed in the corresponding one of the two perforations 312, respectively. The two hooks 334 are slidably accommodated in the corresponding one of the two grooves 311, respectively. When the self-tapping screw 32 is pushed toward the bottom base 33, the bottom base 33 is displaced by the thrust, the two hooks 334 are slide in the corresponding one of the two grooves 311, respectively, until the second surface 33b of the bottom base 33 is contacted against the plate A (as shown in FIG. 4), or the hook 334 is contacted against the second contact surface 311a. Consequently, the bottom base 33 is prevented from falling off the base 31, and the movement range of the bottom base 33 is limited to a required specific area. The human machine interface panel 1 (as shown in FIG. 1A) can be fixed to a plate having a thickness in a specific range, so as to achieve the advantage of high assembly flexibility. In addition, the human machine interface panel 1 cannot not be fixed to a plate having a thickness greater than or less than the specific range, so as to prevent the human machine interface panel 1 from being fixed to a device having a thickness failure to comply with the original factory recommendations. In an embodiment, the specific range is for example but not limited between 1.6 centimeters and 6 centimeters.

Figure 8A:
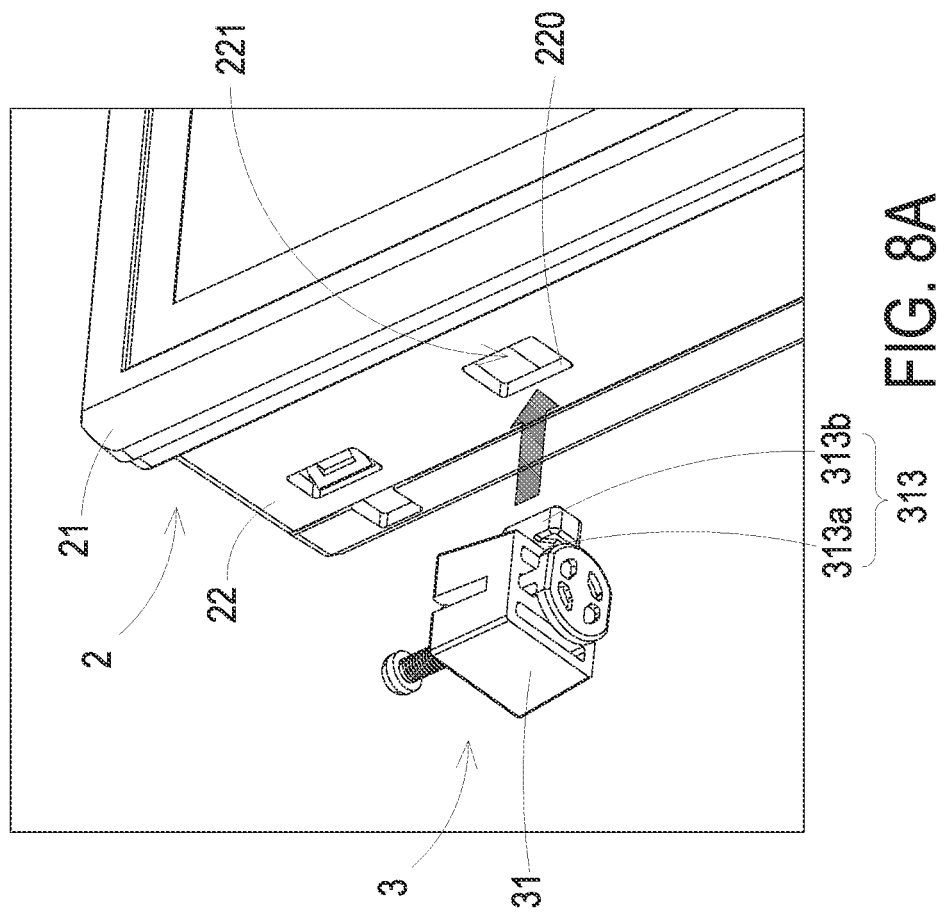
FIGS. 8A to 8C are schematic perspective views illustrating the fixing device of the human machine interface panel of FIG. 1A connecting to the main body.
Figure 8B:
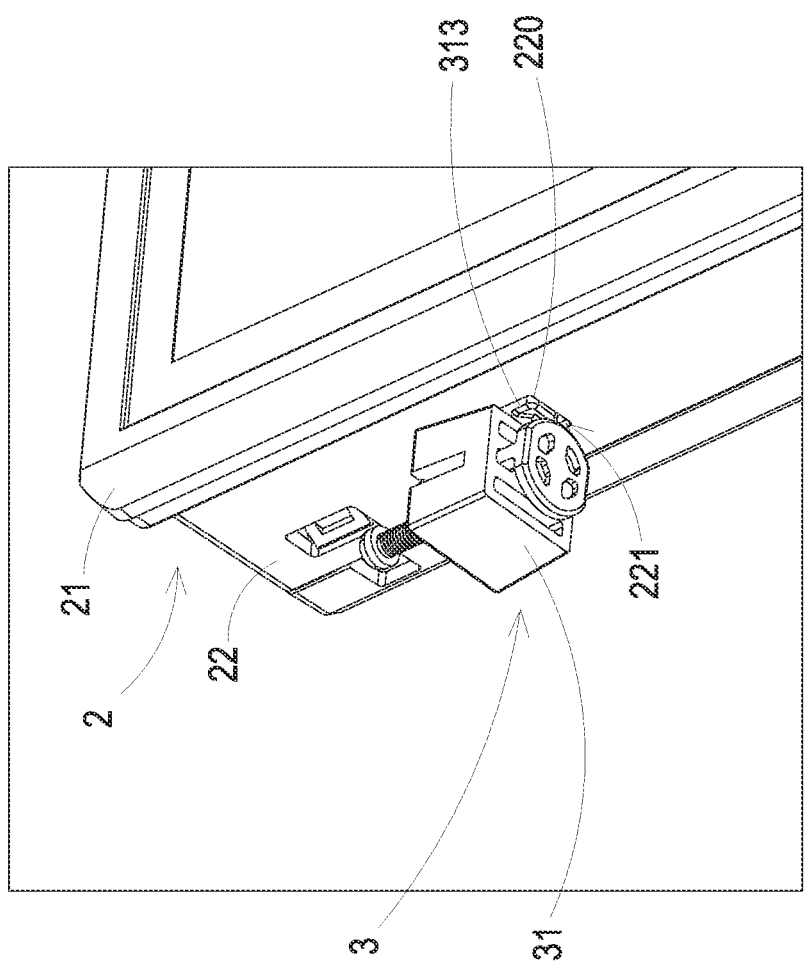
Figure 8C:
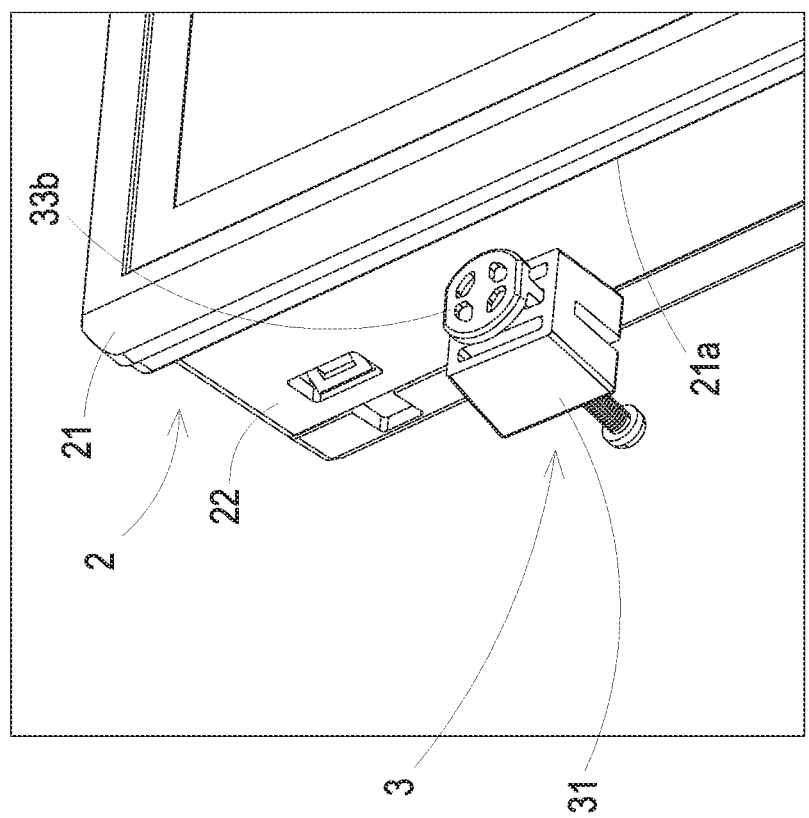

FIGS. 8A to 8C are schematic perspective views illustrating the fixing device of the human machine interface panel of FIG. 1A connecting to the main body. Please refer to FIGS. 1A, 8A, 8B and 8C. In the embodiment, the housing 22 of the main body 2 includes an opening 220 and an accommodation space 221. The opening 220 penetrates through the housing 22, and is in communication between the accommodation space 221 and outside of the housing 22. In the present embodiment, the opening 220 is for example but not limited to a rectangular hole structure. As shown in FIGS. 2B, 2D, 2E, 5, 8A, 8B and 8C, in the embodiment, the base 31 of the fixing device 3 includes a fastening component 313. The fastening component 313 includes a connection segment 313a and a fastening segment 313b. The connection segment 313a is in connection between the lateral surface 31c of the base 31 and the fastening segment 313b. A length of the connection segment 313a is equal to or greater than a thickness of the housing 22 of the main body 2. In the present embodiment, the fastening segment 313b is a rectangular cylinder, and a cross-sectional area of the fastening segment 313b matches a shape of the opening 220 of the housing 22. The fastening segment 313b includes a middle portion 313c, a first end 313d and a second end 313e. The middle portion 313c is in connection with the connection segment 313a. The first end 313d is extended from the middle portion 313c toward the top surface 31a. The second end 313e is extended from the middle portion 313c toward the bottom surface 31b (the direction away from the top surface 31a). As shown in FIGS. 8A and 8B, the fastening segment 313b of the fastening component 313 penetrates through the opening 220 of the housing 22 of the main body 2, so that the fastening segment 313b of the fastening component 313 is accommodated in the accommodation space 221 of the housing 22, and the connection segment 313a of the fastening component 313 is disposed in the opening 220 of the housing 22. As shown in FIG. 8C, when the base 31 shown in FIG. 8A is rotated at a specific angle, for example but not limited to 90 degrees, the first end 313d and the second end 313e of the fastening segment 313b of the fastening component 313 are contacted against an inner surface of the accommodation space 221 of the housing 22. Consequently, the fixing device 3 is fixed to the main body 2. On the contrary, when the base 31 in connection to the main body 2 is rotated at a specific angle, for example but not limited to 90 degrees, the first end 313d and the second end 313e of the fastening segment 313b of the fastening component 313 are separated from the inner surface of the accommodation space 221 of the housing 22. Then, the fastening segment 313b of the fastening component 313 is pulled out from the opening 220 of the housing 22. Consequently, the fixing device 3 is detached from the main body 2. Accordingly, the fixing device 3 is easily and rapidly fixed to or detached from the main body 2 without tools and destroying the main body 2. In the present embodiment, an imaginary plane constituted by a rotation direction of the fixing device 3 is parallel to a connection surface of the housing 22, but not limited thereto.

As shown in FIG. 1A, in the embodiment, the number of the opening 220 of the housings 22 of the main body 2 is four, and the openings 220 are evenly disposed on two opposite sides of the housing 22. In an embodiment, the number of the fixing devices 3 is equal to the number of the openings 220, but not limited thereto. In an embodiment, the plurality of fixing devices 3 and the first contact surface 21a of the display screen 21 jointly clamp a single plate, but not limited thereto. In an embodiment, the plurality of fixing devices 3 and the first contact surface 21a of the display screen 21 clamp a plurality of plates (not shown), but not limited thereto.

Figure 9:
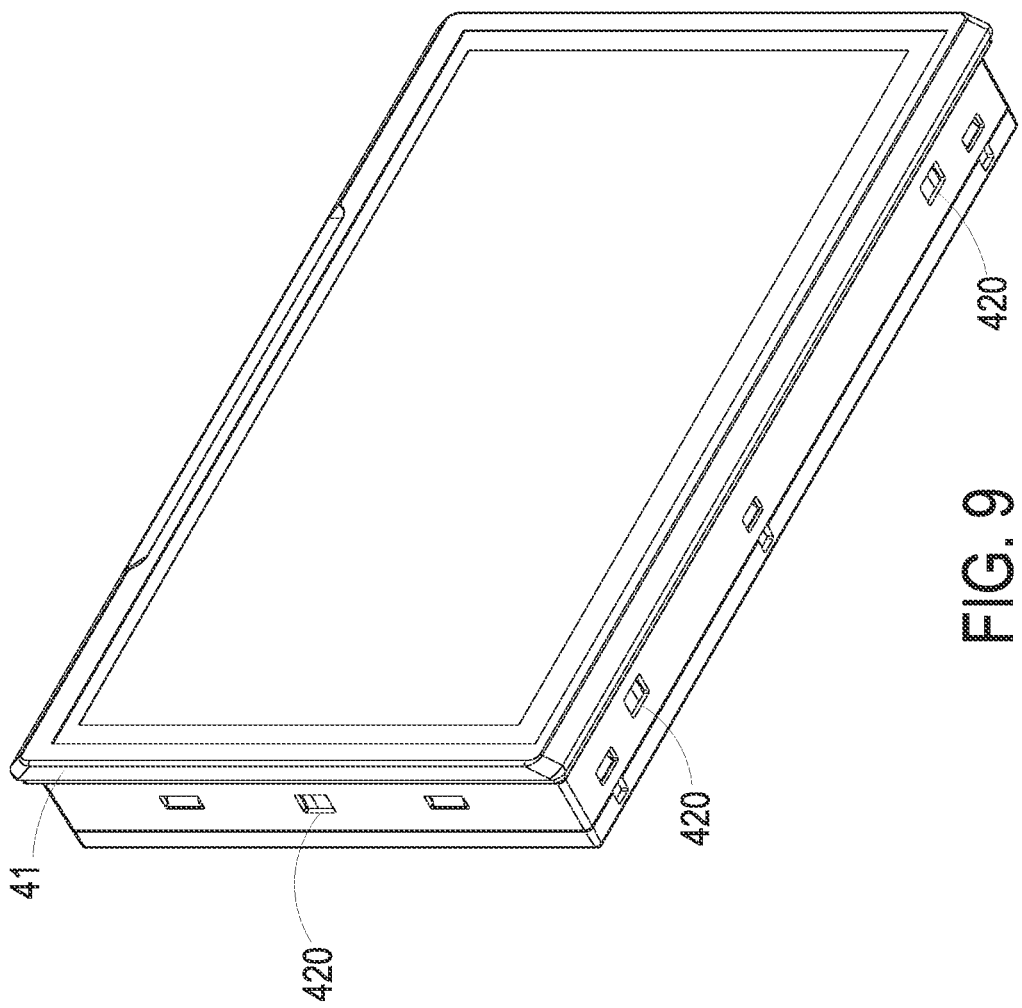
FIG. 9 is a schematic perspective view illustrating a main body of a human machine interface panel according to another embodiment of the present disclosure.

FIG. 9 is a schematic perspective view illustrating a main body of a human machine interface panel according to another embodiment of the present disclosure. In the embodiment, the main body 4 includes a display screen 41. A size of the display screen 41 is 10.1 inches, but not limited thereto. In an embodiment, the main body 4 includes six openings 420. The two opposite sides of the main body 4 are respectively provided with two openings 420, and the other two opposite sides of the main body 4 are respectively provided with one opening 420, but not limited thereto.

From the above descriptions, the present disclosure provides a human machine interface panel having fixing devices. By adjusting the ratio of the first segment and the second segment of the mounting hole of the fixing device, the maximum torque of the interference fit between the self-tapping screw and the second segment of the mounting hole is adjusted to a specific value. Consequently, the plate and the display screen are prevented from being damaged due to excessive thrust. Since the base and the bottom base of the fixing device are made of plastic materials, the advantages of low cost and easily replacing are achieved. The bottom base with a larger area is contacted against the plate, so that the damage caused by the self-tapping screw with smaller area directly contacting against the plate is prevented. The second end of the self-tapping screw is rotatably connected to the positioning recess of the bottom base, so that the self-tapping screw is positioned. Due to the fastening component, the fixing device is easily and rapidly fixed to or detached from the main body without tools and destroying the main body.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A human machine interface panel, configured to combine with a plate, wherein the human machine interface panel comprises:
    a main body comprising a housing and a first contact surface, wherein the housing is disposed on at least a part of the first contact surface; and
    at least one fixing device comprising a base, a self-tapping screw and a bottom base, wherein the base is detachably connected to the housing of the main body, and has a mounting hole, wherein the self-tapping screw penetrates through the mounting hole, and has an interference fit to the mounting hole, wherein the bottom base is disposed at an end of the self-tapping screw,
    wherein by disposing the plate between the bottom base and the first contact surface and tightening the self-tapping screw, the plate is clamped by the bottom base and the first contact surface, so that the human machine interface panel is fixed to the plate.

2. The human machine interface panel according to claim 1, wherein the base is made of plastic material, and has a top surface, a bottom surface and a plurality of lateral surfaces, wherein the plurality of lateral surfaces are in connection between the top surface and the bottom surface, and are connected and adjacent to each other, wherein the mounting hole penetrates through the top surface and the bottom surface of the base, a first segment of the mounting hole penetrates through the top surface, and a second segment of the mounting hole penetrates through the bottom surface, wherein an area of the top surface is greater than an area of the bottom surface.

3. The human machine interface panel according to claim 2, wherein the base is tapered from the top surface to the bottom surface.

4. The human machine interface panel according to claim 1, wherein the base comprises at least one hollow portion, the at least one hollow portion is recessed from the bottom surface toward the top surface.

5. The human machine interface panel according to claim 2, wherein the housing of the main body comprises at least one opening and an accommodation space, wherein the at least one opening penetrates through the housing, and is in communication between the accommodation space and an outside of the housing, wherein the base comprises a fastening component, and the fastening component comprises a fastening segment, wherein a cross-sectional area of the fastening segment matches a shape of the at least one opening of the housing.

6. The human machine interface panel according to claim 5, wherein the fastening segment comprises a middle portion, a first end and a second end, wherein the middle portion is in connection with a connection segment of the fastening component, the first end is extended from the middle portion toward the top surface, and the second end is extended from the middle portion toward the bottom surface, wherein the fastening segment of the fastening component penetrates through the at least one opening of the housing of the main body, so that the fastening segment of the fastening component is accommodated in the accommodation space of the housing, and the connection segment of the fastening component is disposed in the at least one opening of the housing, wherein when the base is rotated at a specific angle, the first end and the second end of the fastening segment of the fastening component are contacted against an inner surface of the accommodation space of the housing, so that the at least one fixing device is fixed to the main body, wherein when the base in connection to the main body is rotated at the specific angle, the first end and the second end of the fastening segment of the fastening component are separated from the inner surface of the accommodation space of the housing, and the fastening segment of the fastening component is pulled out from the at least one opening of the housing, so that the at least one fixing device is detached from the main body.

7. The human machine interface panel according to claim 1, wherein the mounting hole has a first segment and a second segment which are in communication with each other, wherein a first aperture of the first segment is greater than a second aperture of the second segment, wherein a maximum torque of the interference fit between the self-tapping screw and the second segment of the mounting hole is related to a ratio of the first segment and the second segment, wherein when the ratio is smaller, the maximum torque is greater.

8. The human machine interface panel according to claim 7, wherein the bottom base comprises a first surface and a second surface disposed opposite to each other, and the self-tapping screw comprises a rod having a first end and a second end, wherein the first surface is disposed toward the self-tapping screw, the second end of the rod of the self-tapping screw is connected to the first surface of the bottom base, wherein the second surface is disposed toward a direction away from the self-tapping screw, and an area of the second surface is greater than a cross-sectional area of the rod of the self-tapping screw.

9. The human machine interface panel according to claim 8, wherein the bottom base of the at least one fixing device comprises a plurality of concaves, wherein the plurality of concaves are recessed from the second surface of the bottom base toward the first surface of the bottom base.

10. The human machine interface panel according to claim 8, wherein the bottom base comprises a protrusion and a positioning recess, wherein the protrusion is extended from the first surface of the bottom base along a direction perpendicular to the first surface of the bottom base, wherein the positioning recess is recessed from a surface of the protrusion, wherein the second end of the self-tapping screw is rotatably connected to the positioning recess.

11. The human machine interface panel according to claim 8, wherein the base comprises at least one groove and at least one perforation, the at least one groove is in communication with the at least one perforation, wherein the at least one groove is inwardly recessed from the top surface and the lateral surface of the base, wherein a second contact surface is formed in the at least one groove, wherein the at least one perforation penetrates through the second contact surface and the bottom surface of the base, wherein the bottom base of the at least one fixing device comprises at least one arm and at least one hook, the at least one arm is disposed on the bottom base, and is extended from the first surface of the bottom base along a direction away from the first surface of the bottom base, wherein the at least one hook is disposed on an end of the at least one arm, wherein the at least one arm is partially disposed in the at least one perforation of the base, wherein the at least one hook is slidably accommodated in the at least one groove, wherein when the self-tapping screw is pushed toward the bottom base, the bottom base is displaced by a thrust of the self-tapping screw, the at least one hook is slide in the at least one groove until the second surface of the bottom base is contacted against the plate or the at least one hook is contacted against the second contact surface.

12. A fixing device for a human machine interface panel, wherein the human machine interface panel is configured to combine with a plate and comprises a main body, the main body comprises a housing and a first contact surface, wherein the housing is disposed on at least a part of the first contact surface, wherein the fixing device comprises:
   a base detachably connected to the housing of the main body, and has a mounting hole, wherein the mounting hole penetrates through the base;
   a self-tapping screw penetrating through the mounting hole and having an interference fit to the mounting hole; and
   a bottom base disposed at an end of the self-tapping screw,
   wherein by disposing the plate between the bottom base and the first contact surface, and tightening the self-tapping screw, the plate is clamped by the bottom base and the first contact surface, so that the human machine interface panel is fixed to the plate.

* * * * *